US009562465B2

United States Patent
Engineer

(10) Patent No.: US 9,562,465 B2
(45) Date of Patent: Feb. 7, 2017

(54) DUAL PRE-CHAMBER PISTON BOWL SYSTEM

(71) Applicants: Hyundai America Technical Center, Inc., Superior Township, MI (US); Hyundai Motor Company, Seoul (KR); Kia Motors Corporation, Seoul (KR)

(72) Inventor: Nayan Engineer, Canton, MI (US)

(73) Assignees: Hyundai Motor Company, Seoul (KR); Kia Motors Corporation, Seoul (KR); Hyundai America Technical Center, Inc, Superior Township, MI (US)

(*) Notice: Subject to any disclaimer, the term of this patent is extended or adjusted under 35 U.S.C. 154(b) by 107 days.

(21) Appl. No.: 14/338,511

(22) Filed: Jul. 23, 2014

(65) Prior Publication Data
US 2016/0024996 A1    Jan. 28, 2016

(51) Int. Cl.
| | | |
|---|---|---|
| *F02B 19/00* | (2006.01) | |
| *F02B 19/16* | (2006.01) | |
| *F02B 19/10* | (2006.01) | |
| *F02B 19/12* | (2006.01) | |
| *F02B 23/10* | (2006.01) | |
| *F02B 3/06* | (2006.01) | |
| *F02B 19/14* | (2006.01) | |
| *F02B 1/04* | (2006.01) | |
| *F02B 19/02* | (2006.01) | |

(52) U.S. Cl.
CPC ........... *F02B 19/16* (2013.01); *F02B 19/1095* (2013.01); *F02B 19/12* (2013.01); *F02B 23/101* (2013.01); *F02B 1/04* (2013.01); *F02B 3/06* (2013.01); *F02B 19/02* (2013.01); *F02B 19/14* (2013.01); *F02B 2023/102* (2013.01); *F02B 2023/103* (2013.01); *Y02T 10/125* (2013.01)

(58) Field of Classification Search
CPC ............ F02B 1/04; F02B 19/12; F02B 19/14; F02B 3/06; F02B 19/02; F02B 9/16; F02B 19/1095; F02B 2023/102; F02B 2023/103
USPC ........................................................ 123/256
See application file for complete search history.

(56) References Cited

U.S. PATENT DOCUMENTS 2,657,677 A  * 11/1953  Graves ...................... F02B 3/00
                                                      123/27 R
3,955,362 A  *  5/1976  Jones ........................ F01N 3/18
                                                      123/211
7,210,448 B2    5/2007  Stanton et al.

FOREIGN PATENT DOCUMENTS

| JP | 54-022007 B2 | 2/1979 |
| JP | H09-209759 A | 8/1997 |
| JP | 4002823 B2 | 11/2007 |
| JP | 2008-175081 A | 7/2008 |

(Continued)

*Primary Examiner* — Hung Q Nguyen
*Assistant Examiner* — Charles Brauch
(74) *Attorney, Agent, or Firm* — Mintz Levin Cohn Ferris Glovsky and Popeo, P.C.

(57) ABSTRACT

In one embodiment, a combustion system for an engine is disclosed. The system includes a cylinder block that defines a cylinder bore and opposing pre-chambers located along a circumference of the cylinder bore. The system also includes a fuel injector located equidistant from the circumference of the cylinder bore that injects fuel in a direction perpendicular to a diameter of the cylinder bore. The system further includes a piston located within the cylinder bore that has a substantially conically shaped crown having fuel direction grooves that direct the fuel from the fuel injector towards the opposing pre-chambers.

17 Claims, 4 Drawing Sheets

(56) References Cited

FOREIGN PATENT DOCUMENTS

| | | |
|---|---|---|
| KR | 20-1998-0034924 A | 9/1998 |
| KR | 10-2009-0064227 A | 6/2009 |
| WO | WO 2012158756 A1 * 11/2012 | ................ F01B 7/02 |

* cited by examiner

DUAL PRE-CHAMBER PISTON BOWL SYSTEM

BACKGROUND (a) Technical Field

The present disclosure generally relates to a dual pre-chamber combustion system. In particular, a piston bowl system is disclosed that directs fuel towards the pre-chambers.

(b) Background Art

One byproduct of internal combustion within an engine is the formation of nitrogen oxide (NOx) gasses. These types of gasses are formed when nitrogen (N2) combines with oxygen (O2) under the high temperatures associated with the combustion process, thereby forming NOx gasses such as nitric oxide (NO) and nitrogen dioxide (NO2). These gasses can have a number of adverse environmental effects when released into the atmosphere. For example, acid rain, smog, ozone layer depletion, and other adverse environmental effects have been attributed to the release of NOx gasses into the atmosphere.

One way to reduce NOx gas production in a combustion engine is by using a sufficiently lean air-fuel mixture. In particular, the increased amount of air in a lean air-fuel mixture has the effect of decreasing the internal combustion temperatures of the engine, thereby lowering the formation of NOx gasses. However, the use of a lean air-fuel mixture is not without challenges. For example, running an overly lean air-fuel mixture in a traditional combustion engine can cause engine damage and "knocking," among other issues.

Some attempts have been made to support the use of lean and ultra-lean air-fuel mixtures in a combustion engine by making certain modifications to the engine. One such approach has been to use a stratified charge in a gasoline direct injection (GDI) engine. For example, a GDI wall guided design typically uses specialized contours on a piston to direct fuel injected from a side injector towards a centrally located spark plug. In other cases, indirect injection designs have been used in which a fuel injector and spark plug are both located within a pre-chamber, allowing combustion to begin in the pre-chamber and spread to the primary combustion chamber. However, such approaches require complex designs and may have only marginal effects on fuel economy.

In order to solve the problems in the related art, there is a demand for the development of a simplified combustion system that both reduces NOx gas emissions and improves fuel economy.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides systems and methods for providing combustion within an engine. In particular, techniques are disclosed herein that redirect fuel injected along a central axis of a cylinder bore towards pre-chambers located along the circumference of the cylinder bore.

In one embodiment, a combustion system for an engine is disclosed. The system includes a cylinder block that defines a cylinder bore and opposing pre-chambers located along a circumference of the cylinder bore. The system also includes a fuel injector located equidistant from the circumference of the cylinder bore that injects fuel in a direction perpendicular to a diameter of the cylinder bore. The system further includes a piston located within the cylinder bore that has a substantially conically shaped crown having fuel direction grooves that direct the fuel from the fuel injector towards the opposing pre-chambers.

According to various aspects, the fuel direction grooves on the crown of the piston may be configured in any number of different ways. In one aspect, the fuel direction grooves may extend radially away from an apex of the piston in opposing directions. In another aspect, the fuel direction grooves may include portions that extend substantially perpendicular to the diameter of the cylinder bore and portions that extend along the diameter of the cylinder bore. In various cases, either or both of the portions may be curved. In one aspect, the fuel direction grooves may be tapered towards the pre-chambers. In another aspect, the fuel direction grooves may be offset from an apex of the crown of the piston. The fuel direction grooves may, in some cases, include walls that are greater than ninety degrees apart.

In some embodiments, the crown of the piston also includes intake and exhaust valve cutouts. The intake and exhaust valve cutouts may be tapered towards an apex of the crown of the piston, and wherein the fuel direction grooves are tapered away from the apex. In one embodiment, the intake and exhaust valve cutouts may be bisected by the fuel direction grooves.

The cylinder block of the system may define a coolant jacket that at least partially surrounds the cylinder bore. The cylinder block may be constructed of any suitable material and may comprise aluminum, in various embodiments. The combustion system may also include spark plugs located within the opposing pre-chambers.

In one embodiment, a method is disclosed that includes injecting fuel towards a center of a cylinder bore. The method also includes redirecting, by fuel direction grooves in a crown of a piston, the injected fuel towards pre-chambers located along a circumference of the cylinder bore. The method further includes igniting the redirected fuel within the pre-chambers.

In one aspect, the method also includes providing liquid cooling to the cylinder bore. In another aspect, the fuel is injected and redirected during a compression stroke of the piston.

In another embodiment, a combustion system for an engine is disclosed. The system includes means for injecting fuel towards a center of a cylinder bore. The system also includes means for redirecting the injected fuel towards pre-chambers located along a circumference of the cylinder bore. In further embodiments, the system may further include means for igniting the redirected fuel within the pre-chambers or means for cooling the cylinder bore.

Advantageously, the systems and methods described herein provide for the redirection of fuel away from the center of a cylinder bore towards pre-chambers located along the circumference of the cylinder bore, allowing a lean air-fuel mixture to be used during combustion.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
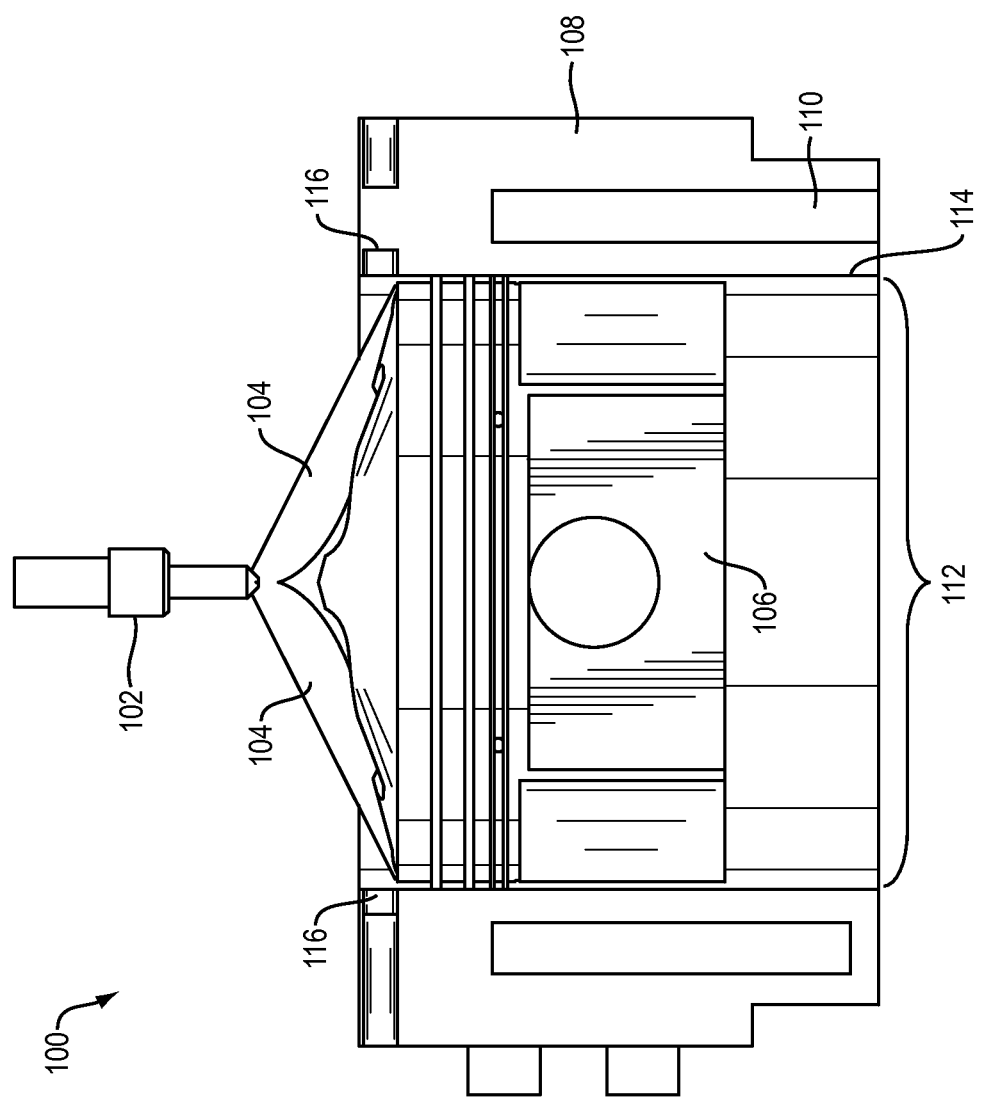
FIG. 1 is an example side view of a dual pre-chamber combustion system.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present disclosure will be described so as to be easily embodied by those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a combustion system and techniques whereby opposing pre-chambers are located along a circumference of a cylinder bore of an engine. A fuel injector located equidistant from the circumference injects fuel towards the center of the cylinder bore, along an axis that is substantially perpendicular to the diameter of the cylinder bore. A piston is also provided within the cylinder bore that is contoured to direct the injected fuel towards the opposing pre-chambers.

Figure 2:
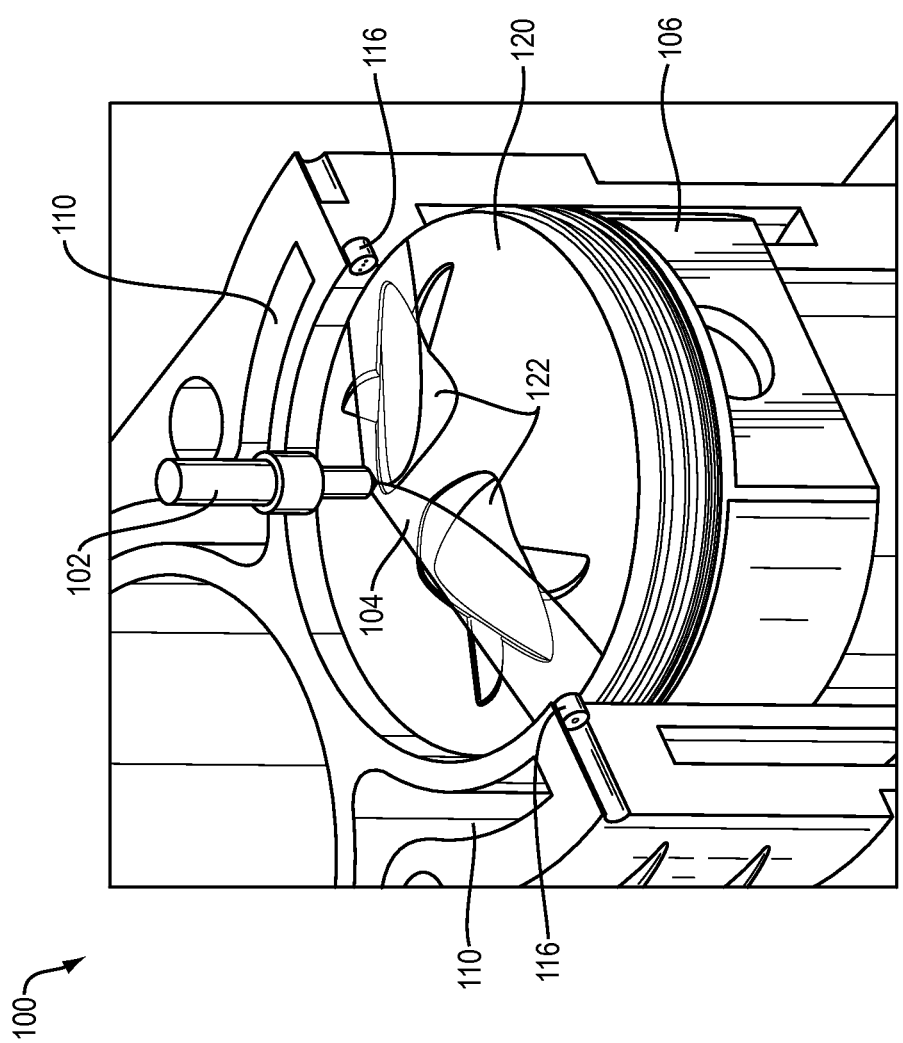
FIG. 2 is an example perspective view of the system of FIG. 1.

Referring now to FIGS. 1 and 2, example side and perspective views of a dual pre-chamber combustion system 100 are shown, according to various embodiments. As shown, combustion system 100 includes a cylinder block 108 through which a cylinder bore 112 is formed. As will be appreciated, cylinder block 108 may have any number of cylinder bores that are similar to cylinder bore 112. For example, cylinder block 108 may have a total of four cylinder bores when configured for use in a four cylinder engine. In some embodiments, cylinder block 108 may be formed using aluminum, an aluminum alloy, or other lightweight material. In such cases, cylinder bore 112 may include a cylinder liner 114 that is constructed using a suitable material, such as steel, to reinforce the interior of cylinder bore 112.

Cylinder block 108 may include a coolant jacket 110 that at least partially encapsulates cylinder bore 112. For example, as shown in greater detail in FIG. 2, coolant jacket 110 may be a hollow structure within cylinder block 108 that surrounds the circumference of cylinder bore 112 and provides liquid cooling to it. Any suitable form of coolant may be used within coolant jacket 110 such as water, ethylene glycol, combinations thereof, etc.

Located within cylinder bore 112 is a piston 106 that is driven by the combustion of an air-fuel mixture within system 100. As will be appreciated, piston 106 is connected to a crankshaft via a piston rod (not shown) and helps to rotate the crankshaft through the movement of piston 106 within cylinder bore 112. During operation, piston 106 alternates between a top dead center (TDC) position (e.g., a topmost position of piston 106 within cylinder bore 112) and a bottom dead center (BDC) position (e.g., a bottommost position of piston 106 within cylinder bore 112) through the controlled operation of combustion system 100.

According to various embodiments, combustion system 100 includes a centrally located fuel injector 102 that injects fuel 104 towards the center of cylinder bore 112. Said differently, fuel injector 102 may be located in combustion system 100 equidistant from all points along a circumference of cylinder bore 112. As shown, cylinder block 108 may also define pre-chambers 116 in which combustion of at least a portion of fuel 104 takes place. For example, spark plugs may be located within pre-chambers 116 and used to ignite a portion of fuel 104 that has been mixed with air. In one embodiment, pre-chambers 116 are located on opposing sides of the circumference of cylinder bore 112, as part of a dual pre-chamber configuration. Each of pre-chambers 116 may also include any number of orifices located along cylinder bore 112 that direct the ignited air-fuel mixture towards the center of cylinder bore 112. In other configurations, any number of pre-chambers may be located along the circumference of cylinder bore 112 at varying locations.

Combustion system 100 may utilize a four stroke operation to drive piston 106. First, during an intake stroke of combustion system 100 (e.g., as piston 106 is traveling from TDC to BDC in cylinder bore 112), a lean air-fuel mixture is provided within cylinder bore 112 via fuel injector 102 and an intake valve (not shown). Since piston 106 is located in this phase between TDC and BDC, the lean air-fuel mixture is therefore provided to the entire combustion chamber. Next, as part of a compression stroke (e.g., when piston 106 is returning from BDC to TDC), a secondary injection of fuel occurs as piston 106 approaches TDC, thereby providing fuel 104 to pre-chambers 116 via the crown 120 of piston 106. Just prior to reaching TDC, the spark plugs in pre-chambers 116 are used to ignite the air-fuel mixture in pre-chambers 116, to begin a power stroke. In response to igniting the mixture in pre-chambers 116, strong jet ignition flames are directed inward towards the center of cylinder bore 112. This provides a strong primary flame kernel to the lean mixture located in the center of the combustion chamber, thereby facilitating a lean burn. For example, each of pre-chambers 116 may have three orifices located along the circumference of cylinder bore 112, thereby directing six jet flames towards the center of the combustion chamber. The combustion of the primary air-fuel mixture in the center of cylinder bore 112 drives piston 106 back towards the BDC position. Finally, during an exhaust stroke (e.g., as piston 106 returns from BDC to TDC), exhaust gasses are vented to an exhaust manifold via an exhaust valve (not shown) and the process repeats.

In various embodiments, piston 106 is contoured to direct fuel 104 towards pre-chambers 116 as part of the secondary fuel injection that occurs during the compression stroke. For example, crown 120 of piston 106 may be substantially conical in shape, which naturally directs fuel 104 towards the circumference of cylinder bore 112. In some embodiments, crown 120 also includes fuel direction grooves 122. Fuel direction grooves 122 generally act as "bowls" that capture and direct fuel 104 from fuel injector 102 towards pre-chambers 116. In contrast to other fuel directing mechanisms, it is to be appreciated that fuel direction grooves 122 direct fuel 104 away from the center of cylinder bore 112. For example, wall-guided piston bowls used in gasoline direct injection (GDI) engines typically operate to direct fuel towards the center of the combustion chamber, where a spark plug is centrally located.

Figure 3:
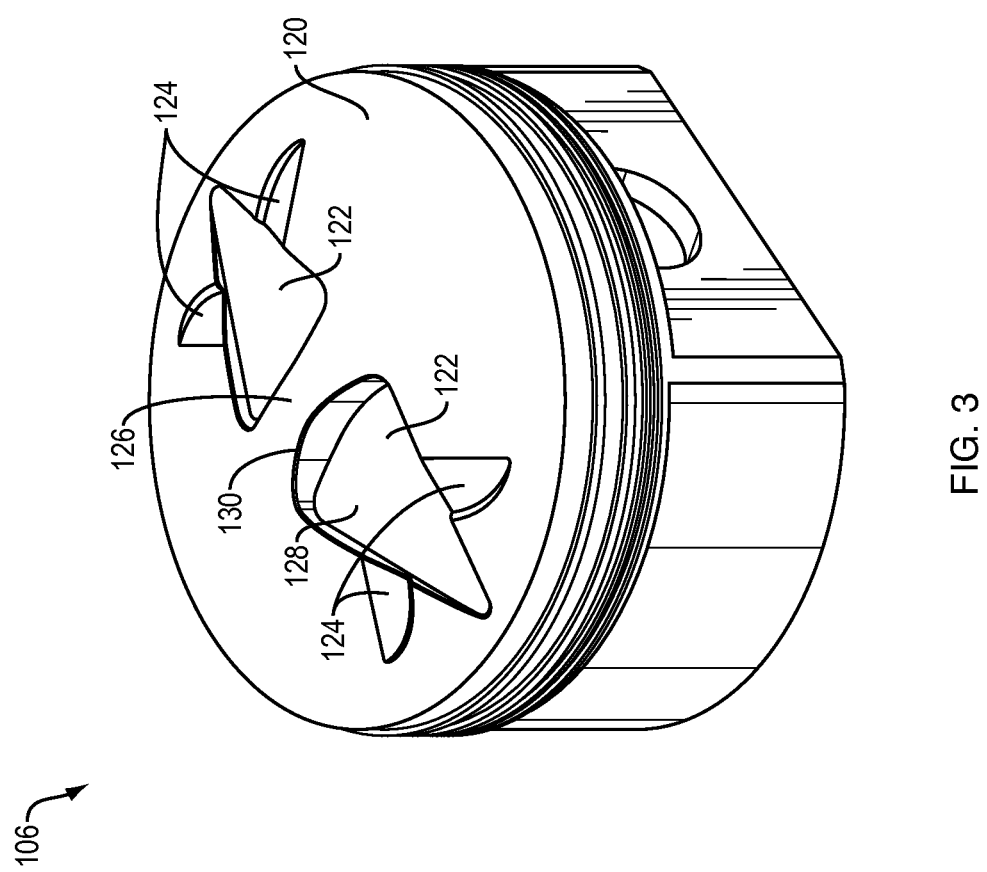
FIG. 3 is an example perspective view of the piston shown in FIGS. 1-2.
Figure 4:
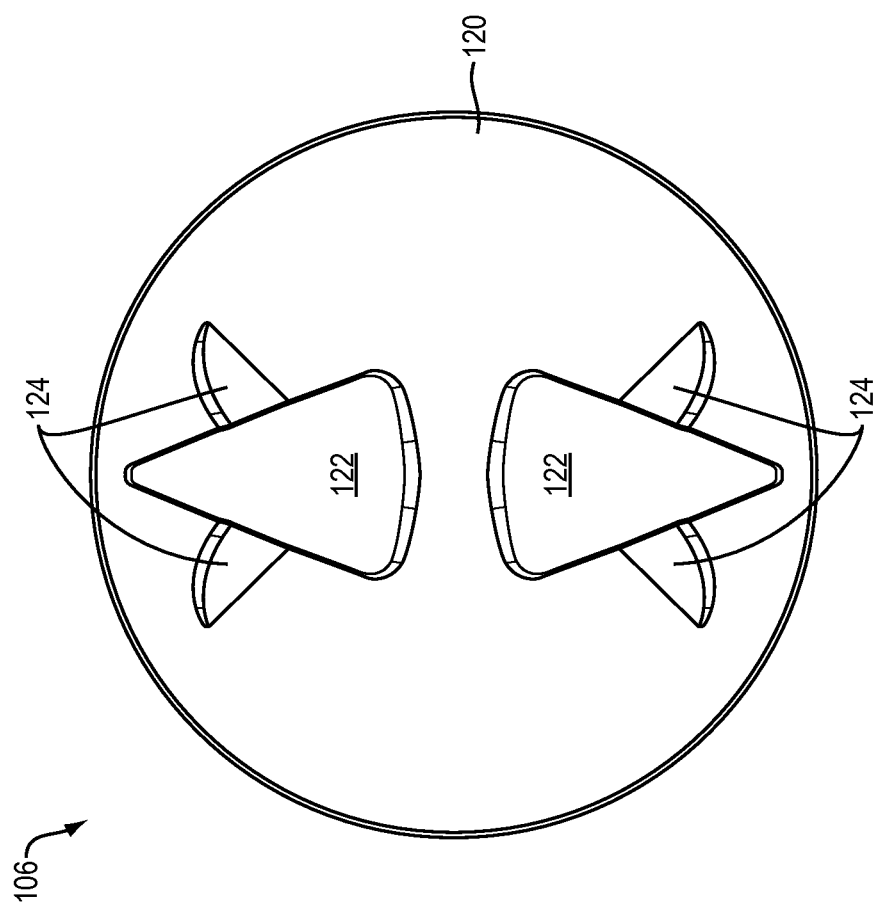
FIG. 4 is an example top view of the piston shown in FIG. 3.

Fuel direction grooves 122 are shown in greater detail in FIGS. 3-4. As shown, fuel direction grooves 122 may extend radially away from an apex 126 of crown 120 in opposing directions and may be tapered to direct fuel towards pre-chambers 116. Fuel direction grooves 122 may be offset from apex 126, allowing apex 126 to direct fuel sprayed towards apex 126 into grooves 122. In one embodiment, each of fuel direction grooves 122 may include a horizontal portion 128 that extends along the diameter of cylinder bore 116 (e.g., the diameter of cylinder bore 116 that extends through pre-chambers 116). Each of fuel direction grooves 122 may also include a substantially vertical portion 130 that extends substantially perpendicular to the diameter of cylinder bore 116. Either or both of portions 128, 130 may also be curved. For example, portion 130 may be curved to maximize the amount of fuel captured from fuel injector 102. The amount of angular offset between portions 128, 130 may also be selected to maximize the flow of fuel towards pre-chambers 116. For example, the angle between portions 128, 130 may be greater than ninety degrees, in some cases, to increase the flow of fuel towards pre-chambers 116.

In some embodiments, crown 120 of piston 106 includes intake and exhaust valve cutouts 124, which may come into contact with the valves during valve overlap conditions. As shown, valve cutouts 124 may be tapered towards apex 126, while fuel direction grooves 122 are tapered away from apex 126. In one embodiment, valve cutouts 124 on each side of piston 106 are bisected by fuel direction grooves 122.

Advantageously, the techniques described herein provide for a combustion system that supports the use of very lean air-fuel mixtures, thereby improving fuel economy and reducing the emission of NOx gasses. In addition, an enhanced piston design is disclosed that directs fuel from a centrally located fuel injector within the combustion chamber towards pre-chambers located along the circumference of the cylinder bore. Such pre-chambers support a lean burn by providing ignited jets of air-fuel mixture back towards the center of the combustion chamber to ignite the primary mixture in the chamber.

While the embodiment of the present disclosure has been described in detail, the scope of the right of the present disclosure is not limited to the above-described embodiment, and various modifications and improved forms by those skilled in the art who use the basic concept of the present disclosure defined in the appended claims also belong to the scope of the right of the present disclosure.

What is claimed is:

1. A combustion system for an engine, comprising:
    a cylinder block that defines a cylinder bore and opposing pre-chambers located along a circumference of the cylinder bore;
    a fuel injector located equidistant from the circumference of the cylinder bore that injects fuel in a direction perpendicular to a diameter of the cylinder bore; and
    a piston located within the cylinder bore that has a substantially conically shaped crown having fuel direction grooves that direct the fuel from the fuel injector towards the opposing pre-chambers, the fuel direction grooves becoming narrower toward the pre-chambers, wherein the fuel direction grooves are formed at locations corresponding to the pre-chambers, respectively, such that the fuel injected by the fuel injector is directed through the fuel direction grooves to the pre-chambers on the circumference of the cylinder bore.

2. The system as in claim 1, wherein the fuel direction grooves extend radially away from an apex of the piston in opposing directions.

3. The system as in claim 1, wherein the fuel direction grooves include portions that extend substantially perpendicular to the diameter of the cylinder bore and portions that extend along the diameter of the cylinder bore.

4. The system as in claim 3, wherein the portions that extend substantially perpendicular to the diameter of the cylinder bore are curved.

5. The system as in claim 3, wherein the portions that extend along the diameter of the cylinder bore are curved.

6. The system as in claim 1, wherein the fuel direction grooves are tapered towards the pre-chambers.

7. The system as in claim 1, wherein the fuel direction grooves are offset from an apex of the crown of the piston.

8. The system as in claim 1, wherein the fuel direction grooves include walls that are greater than ninety degrees apart.

9. The system as in claim 1, wherein the crown of the piston includes intake and exhaust valve cutouts.

10. The system as in claim 9, wherein the intake and exhaust valve cutouts are tapered towards an apex of the crown of the piston, and wherein the fuel direction grooves are tapered away from the apex.

11. The system as in claim 9, wherein the intake and exhaust valve cutouts are bisected by the fuel direction grooves.

12. The system as in claim 1, wherein the cylinder block defines a coolant jacket that at least partially surrounds the cylinder bore.

13. The system as in claim 1, further comprising spark plugs located within the opposing pre-chambers.

14. The system as in claim 1, wherein the cylinder block comprises aluminum.

15. A method, comprising:
   injecting fuel, by a fuel injector, towards a center of a cylinder bore;
   redirecting, by fuel direction grooves in a crown of a piston, the injected fuel towards pre-chambers located along a circumference of the cylinder bore, the fuel direction grooves becoming narrower toward the pre-chambers, wherein the fuel direction grooves are formed at locations corresponding to the pre-chambers, respectively, such that the fuel injected by the fuel injector is directed through the fuel direction grooves to the pre-chambers on the circumference of the cylinder bore; and
   igniting the redirected fuel within the pre-chambers.

16. The method as in claim 15, further comprising: providing liquid cooling to the cylinder bore.

17. The method as in claim 15, wherein the fuel is injected and redirected during a compression stroke of the piston.

* * * * *